United States Patent Office 3,299,619
Patented Jan. 24, 1967

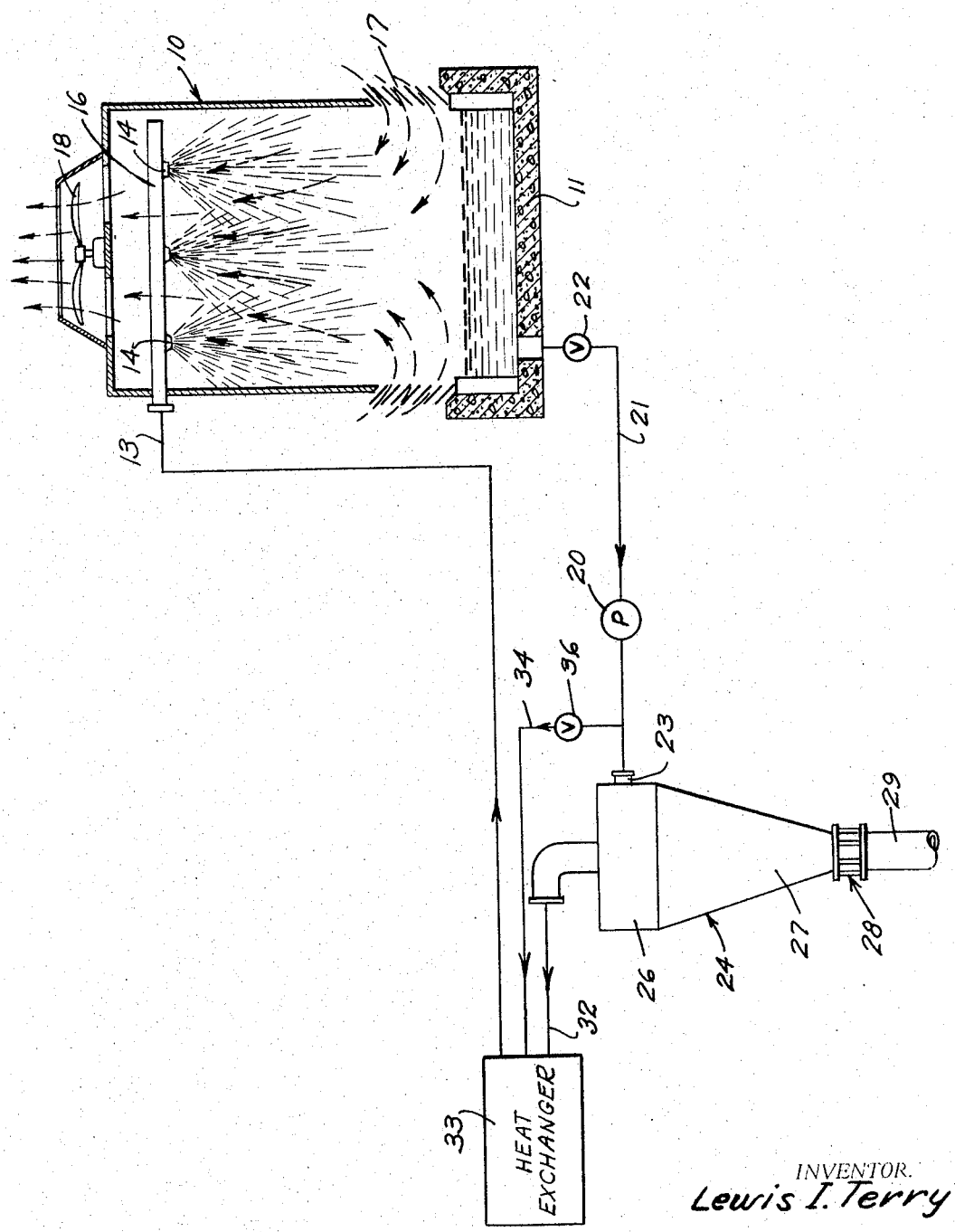

---

3,299,619
REMOVAL OF FOULANTS FROM COOLING WATER
Lewis I. Terry, Chicago, Ill., assignor, by mesne assignments, to W. R. Grace & Co., New York N.Y., a corporation of Connecticut
Filed Feb. 25, 1965, Ser. No. 435,262
1 Claim. (Cl. 55—85)

The present invention relates to the mechanical removal of foulants from open recirculating cooling water systems.

Fouling of cooling water streams can result from many causes. The stream may be fouled with materials, inorganic or organic washed out of the air, products of corrosion from metals in the circulating system, precipitated scale components due to oversaturation during concentration of the water and biological debris from microorganisms such as algae, bacteria, and slime producers. These materials may settle in locations of low flow rates and cause pitting corrosion when anaerobic conditions are established beneath the deposit. The particles may also become a part of the scale type deposits which are laid down on heat exchange surfaces.

Two methods have heretofore been employed generally to relieve the difficulties caused by foulants. One method involves the use of a side stream filter through which a part of the cooling water passes and wherein the suspended particles are removed. The capital required, the operating and maintenance costs of the filter are definite disadvantages of this system.

Another method involves the addition of polyelectrolytes or other peptizing additives to maintain the suspended particles in a dispersed state which precludes or delays their settling. These additives, however, are expensive and their introduction into the cooling water system must be carefully controlled.

All cooling systems require the discharge of a certain amount of water as "blowdown" to prevent overconcentration of dissolved solids. The blowdown may be continuous or intermittent. Blowdown is necessitated by the fact that the water that has evaporated in the tower does not carry away its solids and as a result the solids concentration is built up unless some of the concentrated water is drained off and replaced with make up water. These solids decrease the evaporative properties of the circulating water and they may cause sludge deposits in the system or corrosion of metal.

In accordance with the practice of the present invention, the suspended particles in the circulating cooling water stream are concentrated and removed from the cooling water in a continuous manner. The present invention makes use of a centrifugal separator such as a liquid cyclone separator to concentrate the suspended material into the blowdown stream. The liquid cyclone separator operates by centrifugal action to pass the solid material along with a small portion of the cooling water to the apex of a cone and out of the cyclone separator in the form of a thickened or more concentrated suspension of the foulant materials. Separators of this type are particularly effective on particles having diameters greater than 0.0001 millimeter and up to particle diameters of 0.1 millimeter. Particles of this size range do not settle rapidly and are difficult to remove in an economic manner. The clarified stream is the other effluent from the liquid cyclone separator, and constitutes the major part of the cooling water. This stream is substantially free of suspended matter and may then be returned to the process stream for ultimate recirculation back into the cooling water.

An object of the present invention is to provide a method for removing foulants from open recirculating cooling water systems in a very economical operation.

Another object of the invention is to provide a method for removing foulants from circulating fresh water systems before they can build up into dangerous concentrations.

Still another object of the invention is to provide a cooling water tower method which can be operated to treat all or a portion of the water passing through the cooling water tower for the removal of foulants with or without the addition of treating chemicals.

A further description of the present invention will be made in conjunction with the attached sheet of drawings which illustrates somewhat schematically a cooling water tower system embodying the improvements of the present invention.

In the single figure, reference numeral 10 indicates generally a typical counterflow water cooling tower which includes a cold water collecting basin 11. A relatively warm water stream is introduced into the cooling tower 10 through an inlet fitting 12 by virtue of a conduit 13. Within the cooling water tower 10, the hot water is sprayed downwardly through a plurality of spray nozzles 14 disposed on a spray nozzle manifold 16. The sprayed water thereby comes into counter-current contact with atmospheric air drawn into the system through angularly disposed louvers 17 located just above the collecting basin 11. An exhaust fan 18 exhausts the air which has absorbed some of the heat contained in the hot water being sprayed through the nozzles 14.

The system described thus far is typical of counterflow cooling towers and is described merely for purposes of illustrating one type of cooling water tower system with which the present invention can be employed. Whatever the nature of the system, there is always the problem of the water collecting in the basin 11 being contaminated with foulants which have been picked up by contact with the atmospheric air, or from other sources. The purpose of the present invention is to remove these foulants in an economical and efficient manner.

To this end, the cold water collecting basin 11 is provided with a discharge drain 19 through which the contaminated cold water is fed into a line 21 under the control of a valve 22. The contaminated cold water stream is introduced by means of a pump 20 into an inlet fitting 23 of a liquid cyclone separator generally indicated at reference numeral 24 in the drawings. This type of separator is a commercially available unit including an inlet section 26, a conical section 27, an apex valve 28 and a discharge conduit 29. In operation, the contaminated water stream entering through the inlet fitting 23 is introduced tangentially into the upper section 26 of the separator at sufficient pressure to create a vortex within the body of the separator, whereupon centrifugal forces in the vortex throw the contaminant particles in the water stream to the walls of the conical section 27 where they collect and pass downwardly and out of the unit as a sludge through the apex valve 28 and the discharge conduit or tail pipe 29. A substantially clean cold water stream is then continuously withdrawn through an overflow pipe 31 located at the top of the unit. The overflow pipe 31 feeds a conduit 32 which introduces the cool and relatively clean water stream into the process stream, which, in the illustrated form of the drawings may be a heat exchanger 33.

It is not always essential that all of the contaminated water from the collecting basin 11 be passed into the cyclone separator 24 and, if desired, only a predetermined portion of the stream may be introduced into the separator 24, while the remainder is by-passed directly into the heat exchanger by means of a line 34 controlled by a valve 36. In the heat exchanger 33, the circulating cold water stream absorbs heat from the process stream in which it is in heat exchange relationship, and thereupon becomes reheated and then reintroduced into the cooling tower 10 by means of the line 13.

The use of the cyclone separator on the cool water discharge from the tower basin is the most efficient means for operating the system, because at this point the water normally carries its heaviest load of suspended matter, and the removal of this suspended matter protects the heat exchangers in the system. However, the separator may, if desired, be located on the hot side of the system, that is, between the heat exchangers and the inlet to the cooling tower. Furthermore, it should be evident that any number of such separators may be used in the system depending on the severity of the fouling problem.

From the foregoing, it will be understood that the method of the present invention provides an economical but highly effective means for separating foulants from cooling water streams. The system involved is economical to operate from the standpoint of installation and maintenance and can be made completely automatic in operation.

It will be understood that various modifications can be made to the described embodiment without departing from the scope of the present invention.

I claim as my invention:

In a method of operating an open evaporative recirculating cooling system which comprises contacting a relatively hot water stream with atmospheric air to cool said stream, collecting the resulting cooled water, reheating the water, and again contacting the stream with air, the improvement which comprises passing at least a portion of the circulating water to a liquid cyclone separator to separate the foulants therein in the form of a more concentrated suspension, and discharging said suspension from said cyclone separator.

References Cited by the Examiner

UNITED STATES PATENTS

| | | | |
|---|---|---|---|
| 2,155,853 | 4/1939 | Anthony | 55—85 X |
| 2,585,440 | 2/1952 | Collins | 55—228 X |
| 2,746,564 | 5/1956 | Williams | 55—85 X |
| 3,101,313 | 8/1963 | Woodruff | 210—512 X |

REUBEN FRIEDMAN, *Primary Examiner.*